Aug. 13, 1957     J. REDYARD, JR     2,802,428
WHEEL SLIDE PROTECTION SYSTEM FOR ELECTRIC LOCOMOTIVE
Filed Feb. 21, 1952     2 Sheets-Sheet 1
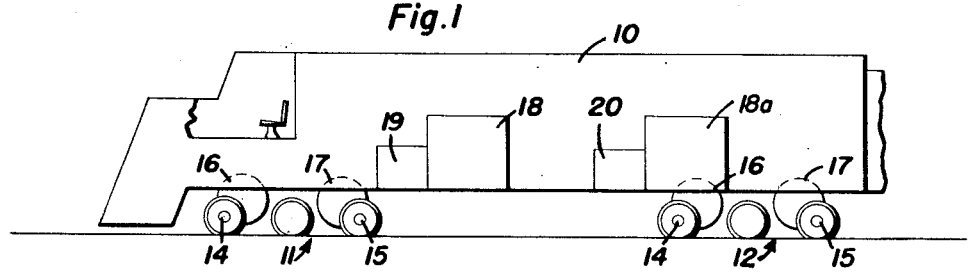
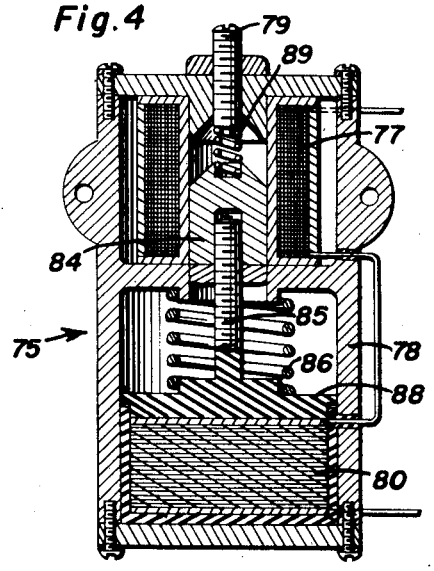
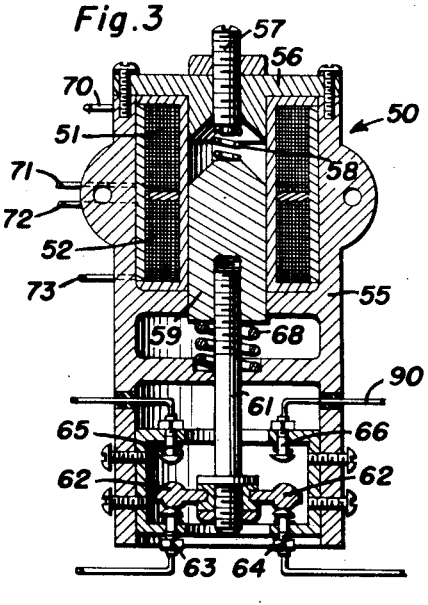
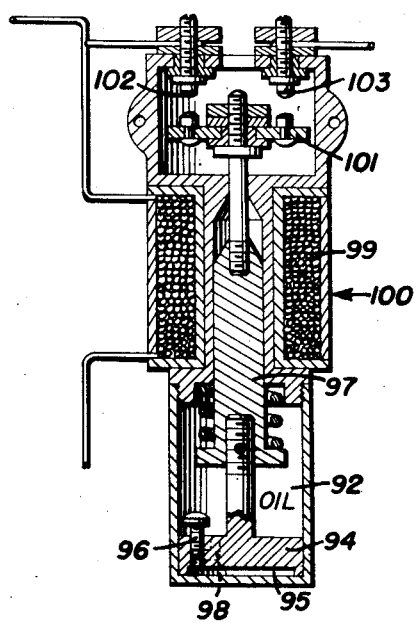
John Redyard, Jr.
INVENTOR.

Aug. 13, 1957  J. REDYARD, JR  2,802,428
WHEEL SLIDE PROTECTION SYSTEM FOR ELECTRIC LOCOMOTIVE
Filed Feb. 21, 1952  2 Sheets-Sheet 2

John Redyard, Jr.
INVENTOR.

United States Patent Office 2,802,428
Patented Aug. 13, 1957

2,802,428

WHEEL SLIDE PROTECTION SYSTEM FOR ELECTRIC LOCOMOTIVE

John Redyard, Jr., Springfield, Mo.

Application February 21, 1952, Serial No. 272,885

8 Claims. (Cl. 105—35)

This invention relates to diesel-electric locomotives and more particularly to protective systems for such locomotives and it has for its principal general object to provide a protective system which protects the diesel-electric locomotive or its traction system against damage due to excessive skidding or locking of a pair of power wheels when the locomotive is drifting or is being towed or during the dynamic braking of the locomotive.

The customary equipment of diesel-electric locomotives comprises safety means against wheel slipping due to loose traction during propulsion of the locomotive under power, in order to avoid an excessive speed of a traction motor operating one of several pairs of power wheels of a unit, supplied by the same generator, and the consequent overloading of other traction motors of the same unit, and in order to prevent damage to the wheels and tracks. However, while many safety systems for protecting the installations against such dangerous speeds and against overloading have been developed, and some of these systems even provide means for guarding against the locking of axles during propulsion of the locomotive under power, no system, to the knowledge of applicant, exists which provides equal safety while the locomotive is drifting, while dynamic braking of the locomotive occurs while the locomotive is towed or shipped dead. It will however be clear that the slipping of wheels during these phases of the locomotive operation is as dangerous and as likely to cause damage as the slipping during the operation of the locomotive under power.

The main object of the invention therefore consists in providing a safety system which is operative under the above named circumstances and which is integrated with or usable in conjunction with the conventional safety systems of diesel electric locomotives, which system is especially designed to announce the occurrence of a dangerous condition during the above named operational phases of locomotive operation and which, in the event that these conditions are not remedied, operates the safety system of the locomotive.

As sometimes temporary disturbances occur which are due to obstacles or track conditions or to other irregularities and which produce the lagging of a pair of wheels of a unit when a locomotive is not under power which are short timed or which correct themselves after a comparatively brief period, a further main object of the invention consists in providing means which operate a safety system merely when the lagging or freezing of a pair of power wheels in a unit lasts for some time which exceeds a predetermined preset period of time.

A number of further objects of the invention can only be explained when referring to specific equipment of the diesel electric locomotive and these objects will therefore be described only in the course of the following detailed specification.

The invention is illustrated in the accompanying drawings showing one embodiment thereof. It is however to be understood that the system which has been illustrated and which is described in detail is shown and described by way of example only in order to explain the principle of the invention and the best mode of applying said principle. It will be clear to the expert skilled in this art that various appliances and connections must vary with the type of locomotive to which they are applied and with the special equipment in which they have to cooperate and a departure from the example which has been illustrated and described is therefore not necessarily a departure from the principle of the invention.

In the drawings:

Figure 1 is a diagrammatic view of a typical disel electric locomotive showing the manner in which a plurality of driving wheels is connected with the diesel electric power plant.

Figures 3, 4 and 5 are elevational sectional views of the relays which are used in the safety system according to the invention.

Figure 3 is a sectional elevational view of a differential relay,

Figure 4 is a sectional elevational view of the armature current limiting relay, Figure 5 is a sectional elevational view of the time delay relay.

Figure 2:
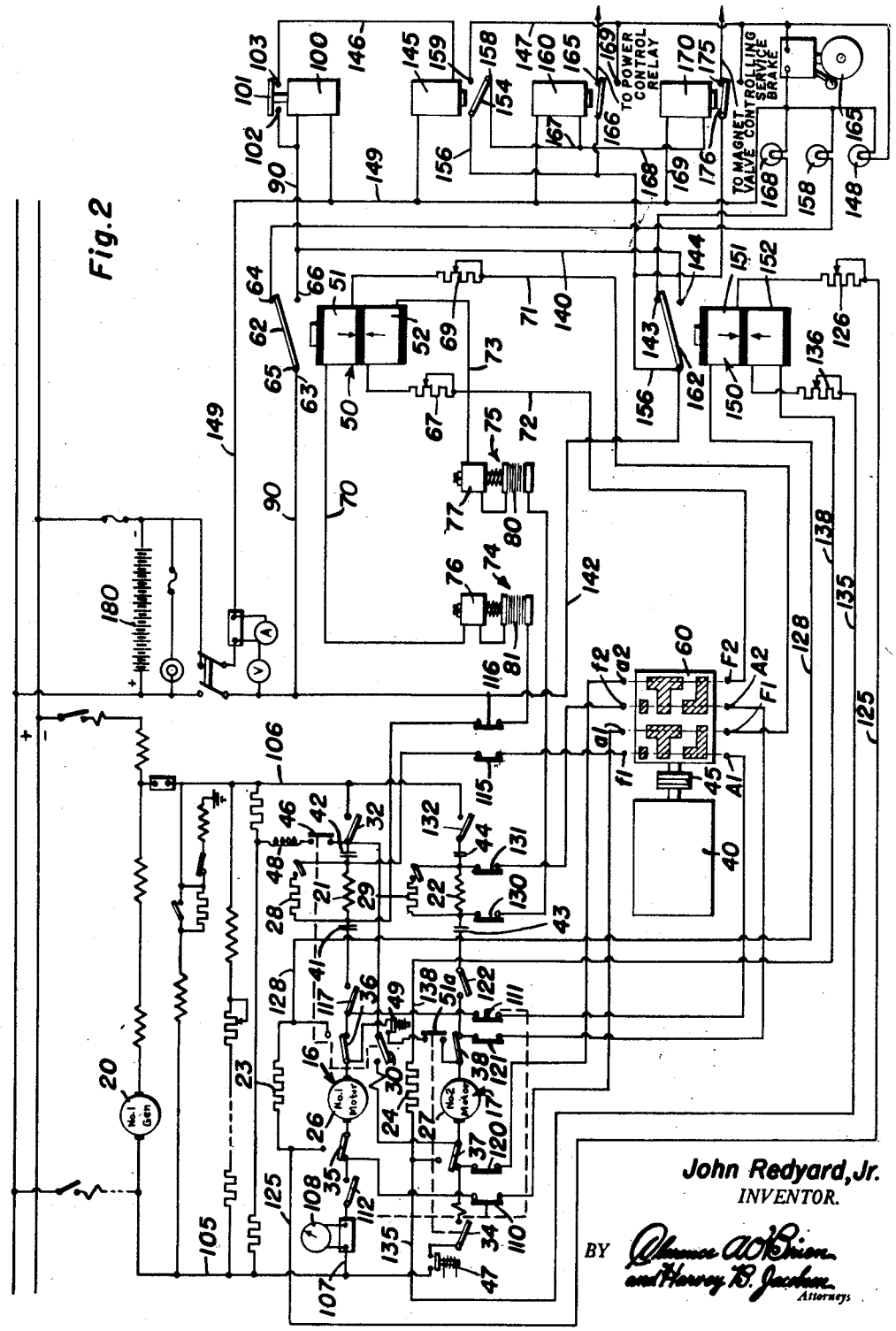
Figure 2 is a diagram of the connections of the safety system according to the invention, the diagram also including the connections of the traction motors as far as they cooperate with the safety system.

A diesel-electric locomotive when operating under power is usually protected against wheel slippage during the starting phase when rapid acceleration is attempted under heavy load, this type of wheel slippage occurring when the traction motors are connected in a starting power circuit. Further, some types of locomotives are provided with a protective system which guards against wheel slippage while the traction motors are in high speed connection, such slippage occurring mainly in the event of slippery tracks. The above named type of protection is necessary since a motor connected with the slipping axle accelerates to a higher speed and may thus reach a speed which causes damage. Moreover, when the traction motors are connected in parallel the slipping of one pair of wheels relieves the motor connected with the slipping axle of any load so that the remaining motors may stall or may be seriously overloaded so that they may be damaged by overload currents.

To remedy this condition wheel slip relays are arranged which in most systems use the power supplied to the axle which is slipping either directly or by means of intermediate control mechanisms or relays. This type of wheel slippage relays, as will be noted, is a safeguard against the dangers to motors or driven parts due to an excess speed of the slipping wheel which is greater than the normal traction speed which usually occurs during connection in a power starting circuit or in a high speed connection circuit. Further, it has been proposed to use control means which act automatically in response to speed variations between traction wheels when the traction motors are connected in high speed circuit relations.

However, experience shows that wheel slippage occurs and may cause dangerous conditions also when the locomotive is not operating under power, for instance when the locomotive drifts or is towed or is shipped, or during dynamic braking in the event that one of the axles freezes. In such a case very dangerous conditions may arise and in fact have actually arisen, against which the usual wheel slippage checking devices or relays are not operative.

The principle on which the invention is based is connected with the fact that the connection of the traction motors usually changes when the diesel-electric locomotive is not under power. When under power the traction motors are connected as series motors or in a series—parallel connection, but when the locomotive is not under power they are connected automatically with some systems in such a way that they act as series generators. When this latter connection is not made automatically it is, at least, possible to make this connection for the purposes of this invention. When the traction motors are in this last named connection it will be clear that current is generated by the traction motors and wheel slippage due to freezing of an axle or to other causes, and even an incipient wheel slippage, will manifest itself by the difference in the currents generated by the traction motors converted into generators on normally working axles and on slipping axles. This difference in the current generated may be detected and may be announced in such a way that corrective measures may be taken. In the event that no corrective measuers are taken the device detecting the difference in the current generated may automatically operate the safety device of the locomotive.

The invention thus essentially consists in an arrangement in which the traction motors are connected as series generators when the locomotive is not under power (for instance during drifting of the locomotive, during dynamic braking, during towing or during shipping of the locomotive) and in which sensitive detecting means are used to detect differences in the current generated by the traction motors operating as generators, which means control a safety system.

The drawings illustrate a diesel-electric locomotive comprising two or more cars, of which only one, indicated at 10, is shown, each unit having two wheel trucks 11, 12 at opposite ends thereof. Each wheel truck is provided with three pairs of wheel units, each wheel unit being carried by an axle 14, 15.

As seen in Figure 1 the leading and the trailing units of each truck 11, 12 are geared to a traction motor 16, 17 respectively, the two traction motors being designated in the specification and drawings—following an accepted custom—as number 1 and number 2 motors.

Usually an individual power plant for each pair of motors is provided, comprising a diesel engine 18, 18a and a generator 19, 20 each motor and generator being provided with suitable control apparatus, those shown in Figure 2 being representative.

The control apparatus for the traction motors and for the control of the generators are those currently used on diesel-electric locomotives and they need therefore not be described, except insofar as they have a connection with the safety system according to the present invention. Each traction motor has an armature winding, only diagrammatically indicated at 26, 27 in Figure 2, a field winding 21, 22 in series with it and across each traction motor armature a brake grid 23, 24 is arranged which is used for dynamic braking. Likewise across each field winding 21, 22 a shunting resistor 28, 29 is arranged to diminish the excitation of the field winding so as to increase the current throuugh the armature winding. By means of a number of power contactors, some of which are usually termed interlocks, the connections of the traction motors may be changed. A series power contactor 30 permits, upon closure of its contacts, to connect the traction motors in series or in series-parallel or in starting circuit relation with the generator while the closing of parallel power contactors 32, 34 permits a parallel connection for high speed running relation with the generator. The switches 35, 36, 37, 38, usually termed cam switches, permit to disconnect the armature of the traction motors from their respective series field windings and to connect them with the braking grids 23, 24. The contacts 41, 42, 43, 44 control the traction motor series field connections and these contactors are controlled by the main power reversing controller 40 which in order to make the drawing clear has been shown separately and without contacts, although it embodies the aforesaid contacts.

The series contactor switch 30 is also provided with an interlock contactor 46 which controls the connection with the customary wheel slip relay solenoid 48. Likewise the parallel power contactor 34 is provided with an interlock contactor 51a controlling the connection of the wheel slip relay solenoid 49. These two interlocks therefore connect the conventional wheel slip relays to the motor circuits, when the diesel-electric locomotive is being operated in series connection or in parallel connection of the motors respectively.

The arrangement thus far described is conventional and merely contains the main features of a well-known and widely used type of diesel-electric locomotive. Further, the contactors and interlocks described below and connected with the safety arrangement according to the invention are contactors provided on or associated with switches or relays which are regularly arranged on the above mentioned customary type of diesel-electric locomotive.

The type of diesel-electric locomotive above described does not have a means for connecting the traction motor series fields in reverse. Therefore, according to the invention, an auxiliary reverser 60 is provided which is connected with the main power reverser 40 by means of a flexible coupling 45 and which is therefore operated with the main power reverser. By means of this auxiliary reverser 60 the traction series fields are connected with reverse polarity with the traction motor armatures through the safety wheel lock control circuit, described below.

The armature windings as well as the field windings of the traction motors and also the brake grids for dynamic braking are all connected with the said safety wheel lock circuits according to the invention. Essentially two such circuit groups are provided. One of the circuit groups, operative in all cases except in the case of dynamic braking, includes a differential relay 50 provided with two equal windings 51, 52 so wound that equal currents neutralize each other.

The construction of this differential relay 50 is shown in detail in Figure 3. It comprises a housing 55 closed by a cover member 56 at the top which member may be threaded in order to receive a screw bolt 57 serving as a support for a spring 58 which presses against the relay core or armature 59. The relay core or armature 59 carries a contactor bolt 61 on which the interlock arm or disk 62 of the relay is mounted, which member 62 cooperates with the two interlock contacts pairs 63, 64 and 65, 66 respectively. A spring 68 is applied against the core on its underside and has its support in a transverse wall of the housing 55 through which the contactor bolt 61 passes. The spring is compressed by the movement of the core into its outermost position and thereby counteracts gravity, to a certain extent, if the relay is mounted as shown in Figure 3. The springs are both so adjusted that they tend to hold the core in the neutral position and against the action of gravity in the example illustrated.

It will be understood that the relay is so adjusted that in the event that the currents flowing through the two coils 51 and 52 are equal the relay will remain in its position of rest which is shown in the drawing. However, in the event of a preponderance of any current flowing through one of the coils (for instance through coil 51), because of a reduction of current flowing through the other coil (52) the core 59 is moved upwardly into the interior of the coils and therefore the interlock cantactor 62 closes the contact 65 and 66.

In order to be able to adjust the action of the differential relay as precisely as possible adjustable resistances 67 and 69 (Figure 2) are provided in the circuits of the coils 51, 52 by means of which a preliminary adjustment equalizing the action of the currents on the coils may be made.

Each of the circuits 70, 71; 72, 73 of the windings 51, 52 of the differential relay 50 includes an automatic current limiting relay generally indicated at 74, 75 respectively in Figure 2 and shown in detail in Figure 4. Each of these relays includes a closed casing or housing 78 which houses an adjustable carbon pile resistance 80 (in relay 75) and 81 (in relay 74), the relay 75 being shown in Figure 4. The adjustment of the carbon pile resistance 80 is produced by a piston or pressure plate 88 which is pressed against the carbon pile by a spring 86. The pressure of the pressure plate 88 may be regulated by means of a solenoid, the winding of which is indicated at 77 in Figure 4 while the corresponding winding for relay 74 is indicated at 76 in Figure 2. The solenoid winding 77 attracts the core 84 carrying a threaded pressure bolt 85 threadedly held in the core 84 of the solenoid which may therefore relieve the pressure on the pressure plate or piston 88 when attracted by the solenoid. The position of the core 84 within the coil 77 may be adjusted by adjusting the relative position of bolt 85 and core 84 and it may further be adjusted by means of spring 89 which is applied against the threaded bolt 79 adjustably held in the cover of the casing 78.

Obviously, upon attraction of the core 84 the pressure of spring 86 on the pressure plate 88 is counteracted and released. The carbon pile resistance and the solenoid are preferably connected in series.

When the diesel-electric locomotive is drifting, or when it is towed with varying speeds the current flowing through the solenoid which is connected in series with the field winding of the traction motor now acting as a generator, as more fully explained below, will increase whenever the speed of the locomotive increases, and will decrease with the speed of the locomotive. As the current increases, the core is lifted and the pressure on the carbon pile 80 is diminished whereby the resistance of the carbon pile increases. Upon decrease of speed of the locomotive and of the current flowing through the solenoid the pressure of spring 86 which is no longer counteracted to the same extent by the action of the current increases and the carbon pile is compressed; its resistance decreases and the current intensity in the circuit again increases.

The current flow variation in the circuit of this limiting relay is therefore kept within very narrow limits or even at an approximate constant level whatever the speed of the locomotive and whatever the intensity of the current which is generated by the traction motors.

As soon as the currents flowing through the two windings 51, 52 of a differential relay 50 are out of balance the relay closes a circuit 90 which includes the time delay relay 100. This time delay relay is provided, as has already been stated, to exclude accidental differences in the speed of the axles which are due to temporary conditions disappearing after a short time and which therefore do not require correction. The time delay relay 100 is shown in detail in Figure 5. The type of relay which is shown is in itself conventional and the type has merely been adapted for purposes of the present invention. It may only be mentioned that this type of relay comprises an oil chamber 92 within which a piston 94 connected with the core 97 of the solenoid 99 actuating the relay may move. This piston is provided with a flow channel 98 (indicated in dotted lines) through which the oil must flow to the space 95 behind the piston when the latter is moved upwardly. The active cross section of the channel 98 may be adjusted by means of a screw 96. The solenoid core can therefore only move into its uppermost position in the figure, in which its contactor 101 connects the two interlocking contacts 102 and 103 when the energization of the solenoid coil has lasted for a time which is sufficiently long to allow a quantity of oil to flow through channel 98 into the space 95, the volume of the oil flowing through the channel corresponding to the enlargement of the space 95 behind the piston 94 when the latter moves upwardly. This volume is finely adjustable and therefore the time necessary for moving the contactor 101 into contact with the interlocked contacts 102 and 103 is also finely regulable.

The contacts 102 and 103 of the time delay relay control the alarm circuits which are now described below.

As seen in Figure 2 the armature windings and the field windings of each traction motor are disconnectible from the main power circuits. In locomotives in which such contactors serving to disconnect the armature and field windings from the main power circuit 105, 106 which leads from the generator 20 are already provided the invention may be carried into effect without additional contactors in the main power circuit. In the diagram shown in Figure 2 it is assumed that four different power contactors either are already present and form part of the equipment of the locomotive or are to be added for the above named purpose.

To isolate the armature winding of motor No. 1 indicated generally by the reference numeral 16, which is connected with the main power line by means of the branch line 107 containing the ammeter or other instrument 108 the contactor 112 is provided which, according to the invention, moves simultaneously with contactors 110 and 111 which, when the connection with feed line 107 is cut, connect the armature winding of the motor with a safety circuit. These contactors 110 and 111 are normally closed and contactor 112 is open when the diesel-electric locomotive is drifting or is towed. The contactors 110 and 111 thus keep the safety circuit connected with the traction motor 16. These contactors are however open when the locomotive runs under power.

Field winding 21 of the motor No. 1 is similarly controlled by contactors 117, 115 and 116, disconnecting the field winding from the armature winding and connecting the field winding with the safety circuit respectively.

A similar set of connectors is provided for motor No. 2 generally indicated by reference numeral 17 with an armature winding 27 and a field winding 22. The contactors disconnecting the armature winding of motor No. 2 from the main power and connecting it with a safety circuit, are indicated at 120, 121 and 122, while the corresponding contactors for the field winding 22 of motor No. 2 are indicated at 130, 131 and 132. The contactors 32 (for motor No. 1) and 34 (for motor No. 2) which also perform the function of disconnecting the respective motors from the main power are part of the normal equipment of the locomotive and are operated in the customary way.

In order to provide protection in the case of a dynamic braking of the locomotive, the braking grids 23 and 24 of each traction motor are connected with a separate differential relay 150 which relay is of a construction similar to that described in connection with relay 50 and is provided with two windings 151, 152. The braking grid 23 is connected over lines 125 and 128 with windings 151 of relay 150, an adjustable resistance 126 being inserted into the connection of the braking grid with said winding in the same manner as described in connection with relay 50. The other braking grid 24 is connected over lines 135 and 138 with winding 152 of the differential relay 150, an adjustable resistance 136 may be inserted in this connection. Relay 150 is practically a duplicate of relay 50 and the two resistances 126 and 136 fulfill the same purpose of adjusting the circuits of the windings in such a manner that the currents produced during dynamic braking balance and neutralize each other with respect to the action of the relay on its armature.

The differential relay 150, when operated, controls an armature 162 cooperating with the two contacts 143 and 144. By means of the armature and of the two contacts 143, 144 the circuits 142 and 140 is controlled (the latter by contact 144), which circuit is parallel to the circuit 90 and which therefore controls the time relay and also by means of the time relay contacts controls the alarm circuit system.

The alarm circuit system which gives notice of a dangerous wheel lock condition and which operates the safety system of the locomotive when this warning does not lead to appropriate counter measures comprises a wheel lock alarm control relay 145 which is energized by the time relay over a circuit 146 as soon the the time delay relay 100 closes its contact. The said wheel lock alarm and control relay 145 controls the other control relays 160, 170 of the alarm circuit system and in addition said relay controls the wheel lock signal light 148 over circuit 156 which is connected with the conductor 142 and with the battery 180 on one side and with the other side of the battery over conductor 149. With the red light 148 the acoustic alarm signal 165 is energized. These two signals warn the engineer that a dangerous condition has developed. As above mentioned the wheel lock alarm relay 145 controls the two further control relays 160 and 170. The relay 160 is a normally energized relay the energizing circuit of which includes the conductor 149 connected with the battery, the conductor 167, the rest contact 158 of the relay 145, the conductor 156 and the conductor 142 running to the other side of the battery. The energization of the relay is therefore controlled by the position of the armature 154 and, as soon as this relay is energized relay 160 is deenergized. The operative contact 165 of this relay together with the armature 166 controls and maintains the circuit of the conventional power control relay of the emergency circuit system of the locomotive so that upon de-energization of this relay the power is shut off on all motors bringing all diesel engines to idle speed or to a stop.

The second control relay 170 is likewise a normally energized relay its energizing circuit including conductor 149, conductor 169, conductor 167, the rest contact 158 of relay 145, and conductors 156 and 142. This relay controls the circuit of the conventional magnet valve which in its turn controls the application of the service brake or of the emergency brake as the case may be.

The alarm system further comprises the two signal lights 158 and 168. These lights are preferably green lights which are connected with the differential relays 50 and 150. Each of these lights is controlled by one of the said differential relays and the condition of the light indicates whether the differential relay is energized or not. The green signal light 158 therefore indicates, when extinguished, that a pair of wheels is sliding or is locked while the locomotive is drifting or is towed and the green signal light 168, when extinguished, indicates the same condition of a pair of wheels during dynamic braking.

It will be understood that the operation of the conventional wheel slide relays, the position of which is indicated at 47 and 49 is not different from the operation of these relays in the customary outfit and it is therefore unnecessary to describe the action of these relays.

The complete operational cycle when a pair of power wheels is locked while the diesel-electric locomotive is drifting or while the locomotive is towed or shipped will therefore consist of the following operational steps.

All the power contactors which are connected with the contactors 30, 32 and 34 are opened during drifting, towing, etc.

All contactors isolating the traction motor armatures, motor fields, etc., from each other (contactors 112, 117; 122, 132) are opened. All interlocked contactors (110, 120; 111, 121; 130, 131; 115, 116) are closed.

With the main reverse 40 which is operated in order to produce the above described connections of the locomotive during drifting, towing, etc., the auxiliary reverser 60 is operated.

By the operation of the main reverser and the auxliary reverser the series traction motors are connected in such a manner that they are running as series generators. It will be seen that this connection includes the safety wheel lock circuits. The auxiliary reverser contacts connected with motor No. 1 are indicated by the index 1 the auxiliary reverser contact connected with motor No. 2 are indicated by the index 2. The armature contacts are indicated by the reference letters A, a and the field contacts are indicated by reference letters F, f. It will be seen from Figure 2 that in certain positions of the auxiliary reverser 60 independent connections of the two traction motors, operated as series generators, are made each of the circuits connected with one of the traction motors including one of the windings 51, 52 of relay 50.

Electrical current generated in motor No. 1 and operated as a series generator is therefore flowing through coil 51 of relay 50 and the currents produced by traction motor No. 2, operating as a generator, are now flowing through coil 52. As long as both traction motors rotate at approximately the same speed the currents produced by them will be approximately equal and the actions of the relay winding 51 and 52 on the core will neutralize each other. The relay therefore remains in its position of rest. Speed variations will, of course, also produce a variation of the current generated by the traction motors but will not affect the operation of the relay 50. These speed variations will produce an action of the speed limit relays 75 and 74 which, in a manner which has already been described, will keep the current flowing through the coils 51, 52 approximately at a constant value. The resistances 67 and 69 must have been adjusted previously in order to eliminate accidental output differences between the two traction motors when operating as generators.

If now a pair of wheels is lagging behind or is locked with the wheels sliding on the tracks during a protracted period of time, the current produced by the traction motor which is coupled with the axle carrying the sliding wheels will markedly decrease or current generation will stop altogether while the second traction motor operates normally, energizing one of the solenoid windings of relay 50. This solenoid winding which is now solely energized will therefore exercise an action on the armature or core 59 of the relay 50 and the core or armature will be attracted thus tripping the relay which now closes contacts 65 and 66. When armature 62 closes the contacts 65, 66 the time delay relay 100 is energized over circuit 90, 149 and after a predetermined period the contacts 102 and 103 of the time delay relay are closed. The closure of contacts 102 and 103 closes circuit 90, 146 which includes relay 145. The latter relay opens the circuit of the control relays 160 and 170 and lights lamp 148, simultaneously sounding the alarm device 165. The circuits over which the two relays 160 and 170 have been energized and the circuit of the lamp have already been described.

When the relay 145 interrupts the energizing circuit of the two relays 160 and 170 these two relays fall back operating the power control relay of the traction locomotive and the magnet valve of the brake installation over the circuits which have already been described.

During dynamic braking the operation is very similar. The potential difference on both sides of the brake grid resistances 23, 24 during dynamic braking produces a current which flows through the windings 151 and 152 respectively of relay 150. This relay which is similar to relay 50 is so adjusted that under normal conditions no action on the relay armature occurs when the currents flowing through the relay windings are balanced. If freezing of an axle occurs during dynamic breaking the current flowing through the brake grid stops and therefore one of the windings will not be energized by the current produced in the traction motor during dynamic braking. This causes an unbalancing of the actions of the windings on the armature so that the relay armature is operated and connects conductor 140 with conductor 142 leading to the battery 180. Thereby again the time delay relay 100 is energized over the above named two conductors and over conductor 90 and return conductor 149. The operation initiated by the time relay is exactly the same as the one already described.

The invention as will be clear from the above description provides a wheel slide safety circuit protecting the traction equipment of the locomotive in all those operational phases in which the present equipment does not provide adequate protection. While the present wheel slide protection equipment is based on connections which are only made and maintained when the locomotive is under power and during actual traction, the invention provides protection during those periods in which no active traction occurs and it is based on connections made in the locomotive which are only made during operational phases in which the locomotive is not under power. As slipping of the wheels or freezing of an axle may occur at any time, whether the locomotive is under power or not it is clear that this additional protection which does not interfere with the existing wheel slippage protection closes a gap in the safety arrangement which the present equipment which is exclusively based on the making of power circuits has left. Therefore the invention provides additional safety without diminishing or reducing the protection which can be derived from customary wheel slippage safety equipment.

It will be understood that within the system which has been described many elements and many unessential connections may be changed without in any way departing from the essence of the invention as defined in the annexed claims.

Having described the invention, what is claimed as new is:

1. A protective system for diesel-electric locomotives including a plurality of electric traction motors having armature and field windings, connected with and supplied with power from diesel-engine driven generators, and further including wheel slip safety circuits controlling wheel slip relays, operated in the event of wheel slip during traction, said safety circuits reducing the current supply to overspeeding traction motors and operating an alarm signal, comprising additional wheel slip safety circuits operating during periods in which the locomotive is moved without the generation of traction power, said circuits including additional differential wheel slip relays each provided with a plurality of relay coils, means for converting the traction motors to series generators supplying said additional safety circuits with electric power, said means including means for disconnecting the diesel-engine driven generators and traction motors, and further means including a main reversing controller, controlling the connection between the armature and the field winding of the traction motors, and an auxiliary reversing controller operated conjointly with the main reversing controller, connecting the traction motors series field windings with reversed polarity with the traction motor armature, and controlling the connections between the additional safety circuits, the armatures of a plurality of traction motors converted into generators and the field windings of said traction motors, each of said additional wheel slip safety circuits being a combined circuit, connected with a plurality of traction motors on one hand and a plurality of relay coils of an additional differential wheel slip relay on the other hand, said relay coils operating the differential relay upon circulation of different currents in them, a power control relay for the locomotive controlling the propulsion power of the same, a brake relay, a control circuit for said power control relay and said brake relay also controlling the alarm signal operated by the wheel slip relays which are operative during traction, a separate source of electric power for the last named relays, said last named control circuit being controlled and closable by the differential additional wheel slip relay and a delaying time relay in said control circuit operated upon closure of one of the additional wheel slip safety relays.

2. A protective system as claimed in claim 1 wherein the means for keeping the currents generated in the traction motors at a constant value consists in a carbon pile resistance and in means for varying the resistance of the carbon pile inversely with the intensity of the current flowing through said resistance.

3. A protective system for diesel-electric locomotives, as claimed in claim 1, comprising in addition means for keeping the currents generated in the traction motors when connected with the protective circuits at a constant value, said last named means including a carbon pile resistance in each protective circuit, compressing means for said carbon pile, biasing means for maintaining constant pressure of said compressing means on said carbon pile, a solenoid provided with a core, said core when attracted by said solenoid counteracting the said biasing means and relieving the pressure of the compressing means, said solenoid being in series with the carbon pile resistance in the protective circuit, a safety system for automatically cutting off the power supply to all units including means for applying brakes, an alarm system for indicating wheel slippage and means operated by said relay for controlling said alarm system and said safety system.

4. A protective system as claimed in claim 1, wherein one of said combined safety circuits is connected with the field windings of a traction motor, and closed by the auxiliary reversing controller when the traction motors are disconnected from the generators for motion of the locomotive without traction power.

5. A protective system as claimed in claim 1 provided in addition with an alarm system with alarm signals operated directly by each of said safety circuit relays and an alarm signal operated by the time delay relay.

6. A protective system for diesel-electric locomotives, as claimed in claim 1, provided in addition with means for keeping the current generated in the traction motors, when connected as series generators and connected with a safety circuit, at a constant value.

7. A protective system for diesel-electric locomotives, including independently driven units, each provided with a power aggregate, electric traction motors having armature and field windings on each unit, means for supplying said units with electric power from diesel engine-driven generators, said electric traction motors having further brake grids connected in parallel to said armature windings for the dynamic braking of the circuits, said units being further provided with wheel slip safety circuits controlled by wheel slip relays, operated in the event of a wheel slip during traction causing overspeeding of a traction motor, said wheel slip relays operating an alarm signal, comprising additional wheel slip circuits operating during the period in which the locomotive is moved without the generation of traction power, said additional wheel slip safety circuits including additional differential wheel slip relays each provided with a plurality of relay windings, means converting said traction motors into series generators supplying said additional wheel slip safety circuits with electric power, said means including means for disconnecting the generators and traction motors and further means including a reversing controller controlling the connection between armature and field windings of the traction motors, said further means also connecting the traction motor series field winding with reversed polarity with the traction motor armature, interlock switches for independently connecting each traction motor of a unit, when connected as a series generator, with its brake grid and with one of said protective circuits containing a relay winding, different traction motors of the same unit being connected with protective circuits containing different windings of one of the additional differential wheel slip relays, a safety system for automatically cutting off the power supply to all units, and means operated by the said additional differential wheel slip relays for controlling said safety system.

8. A protective system as claimed in claim 7, wherein the means for controlling the said alarm system and said differential system include an adjustable delaying device which controls the above mentioned systems, said delaying device including an energizing circuit for the same and the said energizing circuit being controlled independently by either of the differential relays.

References Cited in the file of this patent

UNITED STATES PATENTS

| | | |
|---|---|---|
| 1,336,562 | Hellmund | Apr. 13, 1920 |
| 2,088,485 | Schoepf et al. | July 27, 1937 |
| 2,284,843 | Purifoy | June 2, 1942 |
| 2,332,140 | Finnegan | Oct. 19, 1943 |
| 2,336,052 | Anderson et al. | Dec. 7, 1943 |
| 2,361,099 | Hines | Oct. 24, 1944 |
| 2,381,827 | Lillquist | Aug. 7, 1945 |
| 2,403,933 | Lillquist | July 16, 1946 |
| 2,436,341 | Weybren | Feb. 17, 1948 |
| 2,468,018 | Austin et al. | Apr. 26, 1949 |

OTHER REFERENCES

American Institute of Electrical Engineers' Technical Paper 52–35 presented at the A. I. E. E. Winter General Meeting, New York, N. Y., Jan. 21–25, 1952. Manuscript was submitted October 23, 1951 to A. I. E. E.; 7 pages in all; a copy in class 291–2.